Aug. 4, 1964     H. SPRINGER     3,143,697
TOOTHBRUSH STORAGE CASE AND BATTERY CHARGER
Filed May 31, 1962     3 Sheets-Sheet 1

Inventor:
Hans Springer,
by *Leonard J Platt*
His Attorney.

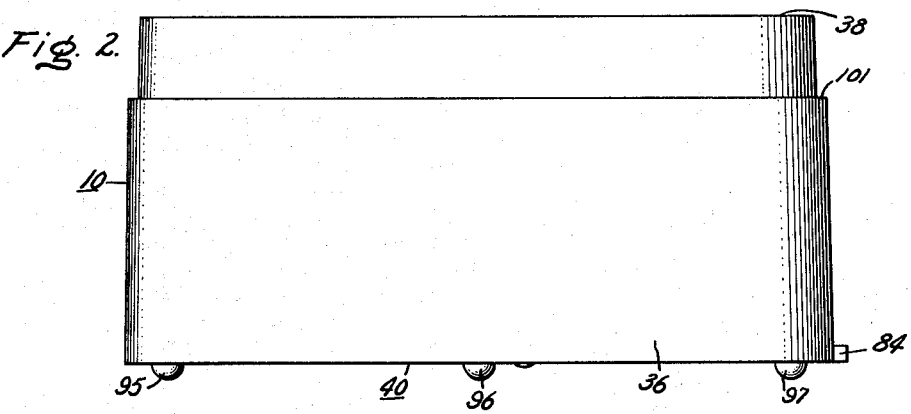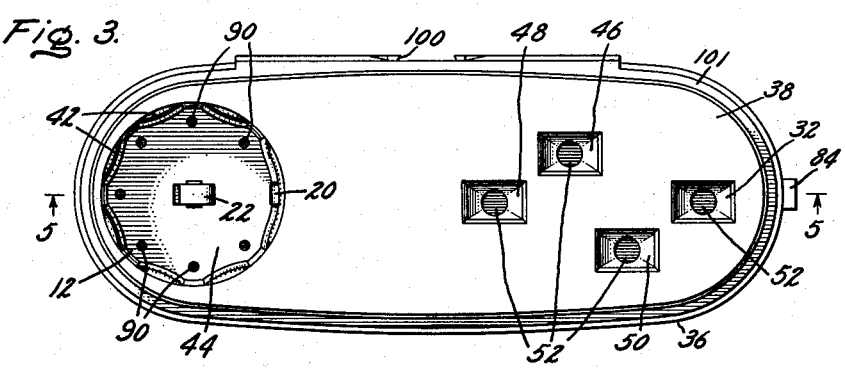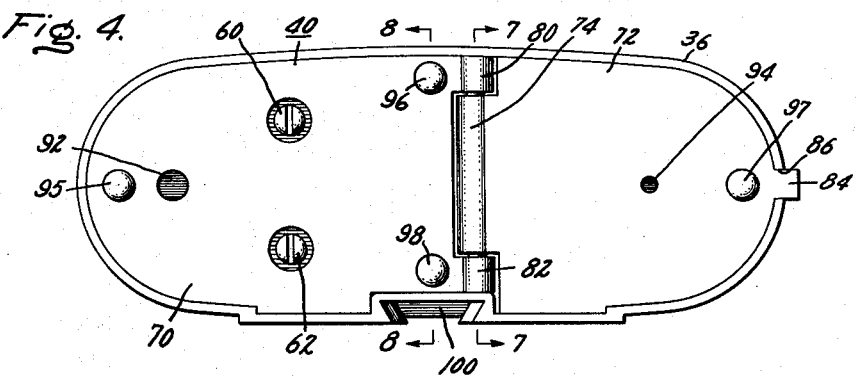

Aug. 4, 1964  H. SPRINGER  3,143,697
TOOTHBRUSH STORAGE CASE AND BATTERY CHARGER
Filed May 31, 1962  3 Sheets-Sheet 3
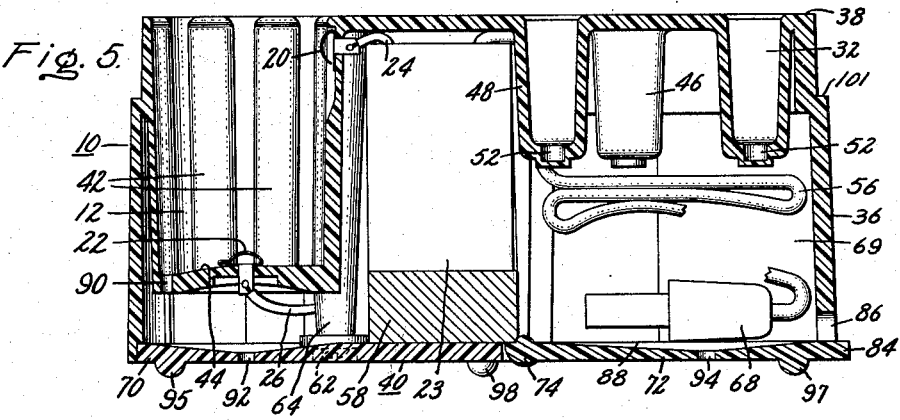
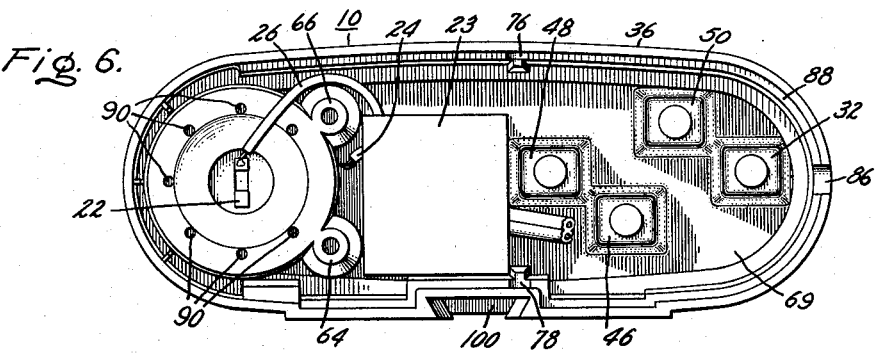
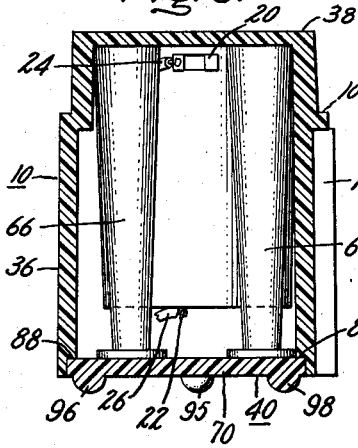
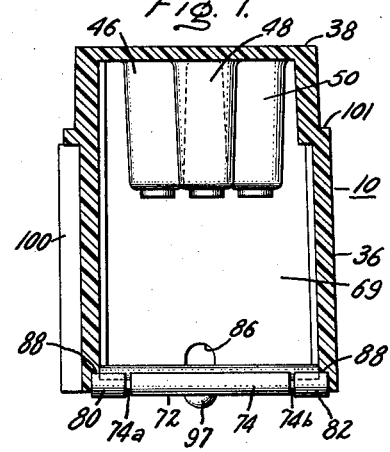
Inventor:
Hans Springer,
by Leonard Platt
His Attorney.

United States Patent Office 3,143,697
Patented Aug. 4, 1964

3,143,697
TOOTHBRUSH STORAGE CASE AND
BATTERY CHARGER
Hans Springer, Ashland, Mass., assignor to General
Electric Company, a corporation of New York
Filed May 31, 1962, Ser. No. 198,884
6 Claims. (Cl. 320—2)

This invention relates to a storage case and battery charging arrangement for a battery powered toothbrush.

In a copending application of Edgar A. Phaneuf and Hans Springer, Serial No. 198,883, filed May 31, 1962, and assigned to the same assignee as the present invention, there is disclosed an electric toothbrush including a motorized handle powered by a rechargeable battery contained in the handle. It is necessary that a device be provided to recharge the battery in the power handle, and it is desirable that the power handle and brushes driven thereby be stored in a convenient and sanitary manner.

Accordingly, it is a primary object of the invention to provide a compact and sanitary case for conveniently storing and recharging a battery powered toothbrush handle.

It is a further object of the invention to provide such a case with a unique arrangement for storing the toothbrushes to be driven by the handle while the brushes are not in use and for storing the power cord which is used to connect the charging mechanism to an electrical outlet.

Briefly stated, this invention in one form includes a housing or case having a plurality of walls and a socket formed in one of the walls for receiving a motorized toothbrush handle containing a rechargeable battery. A battery charging device is located within the case, and suitable means are provided for connecting the battery charging device to contacts which are uniquely positioned in the socket. The contacts in the socket are placed so that when the motorized handle is inserted in the socket they engage complementary contacts which are uniquely located on the outside surface of the motorized toothbrush handle. A power cord extends through the wall of the housing and connects the battery charging device to a conventional power outlet.

Further objects and attendant advantages will become apparent with reference to the following drawings in which:

FIG. 2 is a side elevational view of the battery charger and storage case of the invention;

FIG. 3 is a plan view of the case of FIG. 2;

FIG. 4 is a bottom view of the case of FIG. 2;

FIG. 5 is a sectional elevational along the lines 5—5 of FIG. 3;

FIG. 6 is a bottom view of the storage case with the bottom plate removed;

FIG. 7 is a section elevational taken along the lines 7—7 of FIG. 4;

FIG. 8 is a sectional elevation along the lines 8—8 of FIG. 4; and

Figure 1:
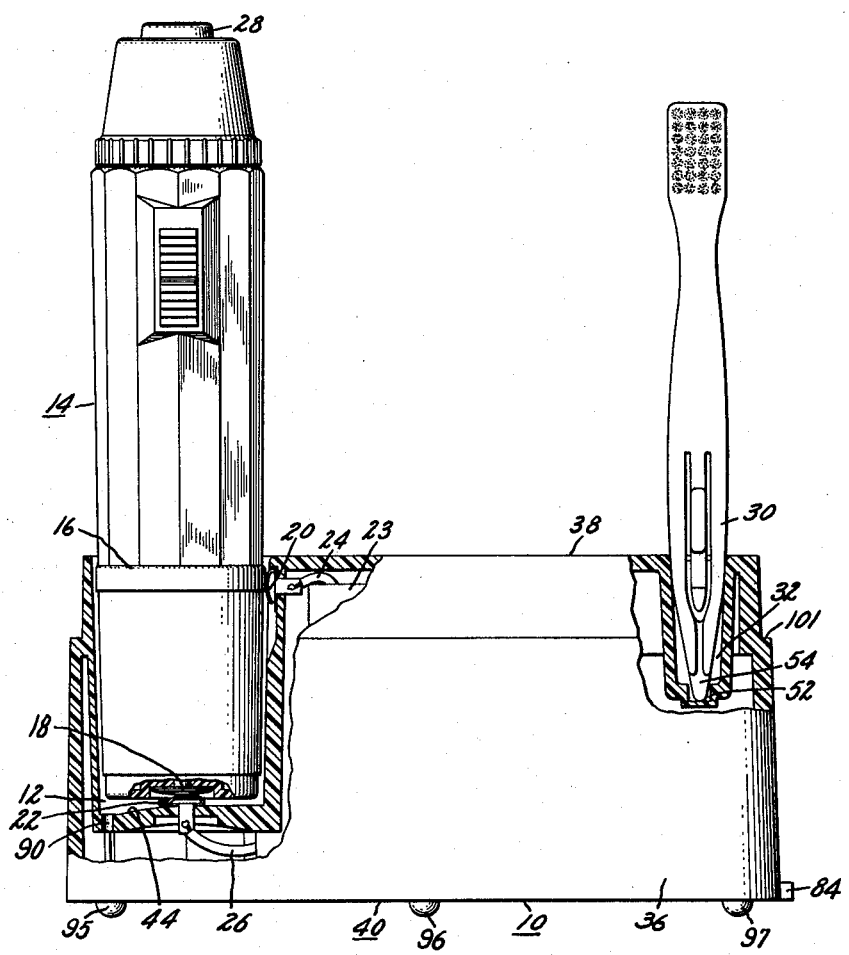
FIG. 1 is an elevational view, partially in section, of the storage case and battery recharger of the invention with a power toothbrush handle and brush member shown positioned therein.

Referring first to FIG. 1, the storage case and battery charger of the invention may be seen as including a housing or case 10 having a socket 12 adapted to receive one end of a motorized toothbrush handle 14. Motive means positioned within the handle 14 includes a small electric motor (not shown) having a pair of terminal contacts which are accessible from the exterior of the handle. These are contact ring 16 surrounding the mid-section of the handle, and contact button 18 positioned within a recessed portion of lower end of handle 14, as viewed in FIG. 1. In accordance with the invention, the handle storage case and battery charger is provided with a charging terminal 20, which contacts battery terminals 16 when the handle is fully within the socket 12, and is further provided with a charging terminal 22 which engages battery terminal 18 when the handle is fully inserted within the socket. Charging contacts 20 and 22 are connected to a battery charging means 23 via conducting wires 24 and 26 respectively.

The upper end of the power handle 14, as viewed in FIG. 1, includes a plunger or toothbrush holding member 28 which is axially reciprocated within the handle by the motive means. The holding member 28 includes a socket (not shown) adapted to receive the lower end of toothbrush shank 30 shown positioned within a socket 32 formed in housing 10. Thus it will be seen that in accordance with the invention toothbrush 30 may be conveniently stored within the socket 32 while the handle 14 is also being stored and simultaneously its battery is being recharged. For a more detailed explanation of the construction and operation of power handle 14 and toothbrush 30 reference may be made to the aforementioned co-pending application to Hans Springer and Edgar A. Phaneuf. A more detailed description of the battery charger and storage case of the invention will be given in the following paragraphs.

Referring to FIGS. 2, 3 and 4, the storage case 10 may be seen as having a tubular side wall 36 with an oval or elliptical shape, a top wall 38 and a bottom wall 40. The housing 10 may be made of the material desired and in any suitable manner; however, it is preferably molded from plastic or similar material so that it is relatively lightweight, completely washable and easy to clean, a good electrical insulator, and relatively inexpensive.

The socket 12 formed within the top wall 38 has a continuous side wall which has primarily a circular cross-section to mate with the cylindrical or slightly tapered toothbrush power handle 14. The socket side wall is formed with a plurality of flat surfaces 42, as seen in FIGS. 3 and 5, to provide firm support for the handle 14 with a minimum of surface contact between the handle and the socket wall. This construction provides for air circulation and reduces frictional resistance to facilitate insertion and withdrawal of the handle 14 from the socket 12, while still maintaining firm support to facilitate good electrical contact between contact ring 16 and terminal 20, as seen in FIG. 1. To further insure good electrical contact, terminal 20 positioned in the side wall of socket 12 may be formed as a stamped metal member and folded to form a curved contacting surface which is flexibly biased toward contact ring 16. Similarly, charging terminal 22 positioned in the bottom wall 44 of socket 12 is formed such that the contact is flexibly urged into engagement with battery contact button 18.

It should be appreciated that contact ring 16 extends completely around the toothbrush handle 14, and contact button 18 is specifically centrally located at the bottom end of handle 14. With this arrangement, it is merely necessary to insert the toothbrush handle within the socket in any position in order to have contact ring 16 and contact button 18 move into engagement with contacts 20 and 22, respectively. Furthermore, with this construction the motorized toothbrush handle may be rotated while it is positioned in the socket to cause contact surfaces 16 and 18 to slide on contact surfaces 20 and 22, respectively, thereby wiping the contact surfaces clean and insuring positive electrical contact.

It is contemplated that the motorized toothbrush handle 14 will be used by several different individuals, such as an entire family, since the toothbrushes such as brush 34 are readily attached and disengaged from the handle 14. Accordingly, the storage case housing 10 may be formed with the number of sockets desired to accommodate the various brushes which will be utilized. In the embodiment shown in the drawings, there is formed four sockets, 46, 48, and 50, in addition to the socket 32 previously mentioned. The upper portions of these sockets, as viewed in FIGS. 1 or 5, are formed with a rectangular cross-section to mate with the rectangular cross-section of the toothbrush shank 30, while the bottom wall of each brush shank socket is formed with a cylindrical recess 52, as shown for socket 32, to accommodate the tip 54 of shank 30. Note that the brush sockets are slightly tapered from their upper or outer end to their inner or lower end to insure a relatively tight fit.

The battery charging means 23 is shown in FIG. 5 as a box-shaped member centrally positioned within the housing 10. The various electrical components contained in the box will be described in connection with the electrical circuit diagram of FIG. 9, but since the individual components are conventional they are not physically shown within the box. The electrical components are preferably sealed within the box with suitable potting compound, so that only the conducting wires 24 and 26 and the electrical power cord 56 extend from the box. By so sealing the components, the electrical charging means will not be damaged by water or other materials which may come in contact with the storage case. The charging means 23 is shown supported by a cushion 58 which is in turn supported by bottom wall 40. The bottom wall 40 is secured to the case 10 by means of a pair of screws 60 and 62, or other suitable fastening means, which are threadedly received within tubular support members 64 and 66 integrally formed within the housing 10, see FIGS. 4, 5 and 6.

The electrical charging means 23 may be operated by household alternating current of approximately 115 volts; thus power cord 56 includes a plug 68 adapted to be inserted in a conventional wall convenience outlet. When the power cord 56 is not in use, or when the plug 68 is plugged into an outlet but the entire length of cord is not needed to reach the outlet, it is undesirable to simply leave the cord extending from the case. Instead it is preferable that storage space be provided within the housing 10 so that the cord is protected and the unit presents a neat appearance. Also when the case is to be stored in a person's luggage while travelling, it is particularly important that the unit be as compact as possible to conserve space. In accordance with this invention, storage space for the cord is provided by uniquely utilizing the space 69 within the housing beneath the toothbrush sockets as a storage compartment. The bottom wall 40 of the housing 10 is composed of a fixed plate or section 70 and a movable section 72, which serves as a cover for compartment 69 to permit access thereto. A further description of the cover 72 and its unique cooperation with the remainder of the case and the power cord will be described in greater detail in describing the case assembly operation.

During the operation of an automatic toothbrush, the power handle may come into contact with dentifrice, moisture and other material. Occasionally, it may be necessary to rinse the handle in water on completion of the brushing operation. To eliminate the necessity to dry the power handle with a cloth, the storage case of the invention has been conveniently provided with means which permit the handle to be placed into the case while wet in that proper drying and ventilation are obtained within the case. Referring to FIGS. 3 and 6, it can be seen that the integral bottom wall 44 of the socket 12 has been provided with a plurality of apertures 90 arranged in a circular pattern adjacent the outer edge of the wall. These apertures permit water and other material dripping from the handle to drain from the socket, and they also permit air to circulate through the socket to thereby dry the handle. While water in contact with the charging terminals of the storage case presents no electrical hazard in view of the low voltage and current involved, it is nevertheless desirable to prevent foreign material from collecting on the terminals so that good electrical contact will be insured between the charging terminals and the battery terminals. For this purpose, the central portion of the bottom wall 44 is raised with respect to the surrounding edge portion, as may be seen from FIGS. 1 and 5. As a result, material dripping from the power handle will immediately drain through the apertures 90 without coming into contact with charging terminal 22 located in the central portion of the socket wall 44. To further facilitate draining, it should be noted that the apertures 90 are vertically aligned with the side wall of the handle so that the most direct drainage path is obtained. Positioning the aperture in this manner also produces very effective air circulation.

To prevent water or other liquid from collecting within the lower portion of the case beneath socket 12, the bottom wall section 70 is formed with a vent hole 92, as seen in FIGS. 4 and 5. Since the power cord 56 may occasionally be wet when brought within the storage compartment 69, the cover 72 has similarly been provided with a drainage and air circulation vent hole 94. Further, if desired, toothbrush shank sockets 32, 46, 48 and 50 may be provided with vent openings.

As another feature of the invention, the battery charger and storage case may be supported on a shelf or similar horizontal surface or optionally mounted on a wall or similar vertical surface. When positioned on a shelf, a plurality of nibs, FIGS. 1 and 4, or projections 95, 96, 97 and 98 formed integrally with bottom wall 40 engage the shelf surface. This limited contact with the shelf further facilitates air circulation to obtain proper drying. In the event it is desirable to mount the battery charger and storage case on a wall, the housing side wall 36 has been provided with a dovetailed slot 100 seen in FIGS. 4, 6-8. By simply mounting a mating bracket (not shown) adapted to be received within the slot 100, the housing 14 may be conveniently mounted and removed from the wall surface.

Since the recharging and storage case of this invention includes a minimum number of parts, manufacturing and assembly operations are also kept to a minimum. In assembly, the electrical recharging means 23 is positioned within a central portion of the case between the handle socket and the toothbrush sockets, and its lead wires 24 and 26 are connected to the charging terminals in the socket walls. Cushion 58 is placed against the lower surface of charger 23 and held in position by bottom plate 70, which engages peripheral flange 88 and is secured to the case by screws 60 and 62. However, prior to installing plate 70, cover 72 is placed in position engaging flange 88 to cover the cord storage compartment 69. The cover 72 is integrally formed with a hinge portion 74 including hinge pins 74a and 74b. These pins are received within recesses 76 and 78, respectively, in the lower edge of housing side wall 36, seen in FIG. 6. To retain the hinge pins within the recesses 76 and 78, the bottom wall section 70 is integrally formed with a pair of retaining lugs 80 and 82, which cooperate with recesses 76 and 78, respectively to house the hinge pins, as shown in FIGS. 4 and 7. Thus, the cover is in effect self-hinged and therefore obviates the need for the various hinging elements more commonly employed.

To further minimize the number of parts required, cover 72 is formed with an integral tab or projection 84, which is frictionally received within the lower portion of an aperture 86 in side wall 36, seen in FIGS. 5-7. Thus, the cover may be operated and closed by simply swinging the cover by means of projection 84. To further simplify the manufacture of the case, the aperture 86 uniquely serves an additional function besides retaining projection 84. Since the movement of cover 72 is limited by peripheral flange 88, the movement of projection 84 into aperture 86 is similarly limited. Thus, by extending the aperture upwardly, its upper portion, as viewed in FIGS. 5 and 7, provides an opening to which power cord 56 may extend when the cover 72 is closed. When the power cord is to be connected to a wall outlet, the cover 72 is pivoted into open position and the amount of cord required to reach the outlet may be withdrawn from the storage compartment. The cord is then placed in the upper portion of the opening 86 to permit the cover to be snapped into closed position. From the foregoing, the simplicity of construction of the molded case of the invention together with the ease of assembly and operation will be appreciated.

Figure 9:
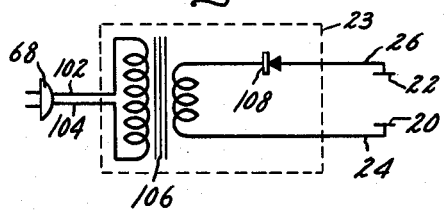
FIG. 9 is a schematic view of the charging circuit of the invention.

Referring now to the charging circuit of FIG. 9, the outlet plug 68 is shown with conducting wires 102 and 104 of power cord 56 connected to the primary coil of a step-down transformer 106 of the electrical means 23. The secondary coil of the transformer 106 is connected to a diode rectifier 108 connected in series with charging contacts 22 and 20. Connecting contacts 16 and 18 of handle 14 between contacts 22 and 24 complete the electrical circuit through the battery. The battery to be charged has a relatively low voltage of approximately 1.2 volts. Accordingly, the transformer 106 lowers the A.C. input voltage, and the diode rectifier 108 converts the alternating current to D.C. current to provide a suitable D.C. voltage of approximately 1.5 to 2 volts. When the battery is inserted within the circuit and the transformer primary coil is not energized, current through the load circuit is negligible, so the battery will not discharge itself through the charger circuit.

It will be appreciated that the battery recharger unit is completely safe in that the possible power output of the circuit across the charging terminals 20 and 22 is very low. Consequently, if a person should contact both charging terminals 20 and 22 to close the circuit, while the circuit is energized, the current flow would be imperceptible to the touch, thus causing no injury or discomfort.

While a specific embodiment of the invention has been shown and described in the foregoing paragraphs, it should be understood that the invention is not limited to the particular construction described. Accordingly, it is intended in the appended claims to cover all modifications within the spirit and scope of the invention.

Having thus described the invention, what is claimed is:

1. A storage case and battery charger for a motorized toothbrush comprising a housing formed of molded plastic insulating material; said housing having an integrally formed top wall, side walls, and a socket for receiving a toothbrush power handle, said toothbrush power handle being formed of molded plastic insulating material; an enlarged opening provided at the bottom of said charger housing; battery charging means centrally positioned within said housing, an electric cord storage compartment formed within said housing between a side wall of said housing and said battery charging means, a generally flat bottom plate positioned immediately below said socket and battery charging means for partially closing the enlarged opening formed in the bottom of said housing, hinge means integrally formed at one side of said bottom plate, a cover hinged to said bottom plate for selectively providing access to said electric cord storage compartment, an electrical power cord fixed to said battery charging means and extending through said compartment whereby said power cord may be stored within said compartment when not in use.

2. A storage case and battery charger for a motorized toothbrush comprising a housing formed of molded plastic insulating material, a socket integrally formed at one side of said housing for receiving a toothbrush power handle containing a rechargeable battery, battery charging means positioned in said housing, said toothbrush power handle being formed of molded plastic insulating material, said socket having a generally circular side wall and a bottom wall, vent means in said bottom wall, a charging contact fixed to said plastic circular side wall, a charging contact fixed to the bottom wall of said socket and spaced upwardly from said bottom wall and said vent means, said power handle having a generally circular side wall and an end bottom wall, a metal contact located on the end bottom wall of said power handle, a circular metal contact ring positioned upwardly from the contact formed on the end bottom wall of said plastic handle so that said power handle may be readily inserted into said socket for permitting the bottom contact on said handle to engage the contact fixed to the bottom wall of said socket and the circular metal contact ring to engage the contact fixed to the circular side wall of said plastic socket, a generally flat bottom plate positioned below said socket and battery charging means for closing said enlarged opening.

3. A storage case and battery charger for a motorized toothbrush comprising a housing formed of molded plastic insulating material, said housing having an integrally formed top wall, two side walls, a front wall, and a rear wall; an integrally formed plastic socket for receiving a toothbrush power handle extending downwardly from said top wall toward said bottom wall, said toothbrush power handle being formed of molded plastic insulating material, said socket having a generally circular side wall and a generally flat bottom wall spaced upwardly from the lowermost portion of said housing, a contact button generally centrally located in said flat bottom wall and a plurality of apertures integrally formed in the bottom wall of said socket, an enlarged opening provided at the bottom of said charger housing, battery charging means positionable within said housing through said enlarged opening, an electric cord storage compartment formed within said housing at one side of said housing immediately adjacent to one of said side walls, a generally flat bottom plate and cover positioned immediately below said socket and battery charging means for closing said enlarged opening, hinge means connecting said cover to said bottom plate, an electrical power cord fixed to said battery charging means and extending through said compartment whereby said power cord may be stored within said compartment when not in use, a plurality of integrally formed toothbrush receiving sockets extending downwardly from said top wall and into said cord receiving compartment, and a dovetailed slot integrally formed in the rear wall of said housing for mounting said housing on a wall or similar surface.

4. A storage case and battery charger for a motorized toothbrush comprising a housing formed of molded plastic insulating material; said housing having an integrally formed top wall, two side walls, a front wall, and a rear wall; an integrally formed plastic socket for receiving a toothbrush power handle extending downwardly from said top wall toward said bottom wall, said toothbrush power handle being formed of molded plastic insulating material, said socket having a generally circular side wall and a generally flat bottom wall spaced upwardly from the lowermost portion of said housing; a contact button generally centrally located in said flat bottom wall and a plurality of vent apertures integrally formed in the bottom wall of said socket; an enlarged opening provided at the bottom of said charger housing; battery charging means positionable within said housing through said enlarged opening; an electric cord storage compartment formed within said housing at one side of said housing immediately adjacent to one of said side walls; a generally flat bottom plate and cover positioned immediately below said socket and battery charging means for closing said enlarged opening; hinge means connecting said cover to said bottom plate; an electrical power cord fixed to said battery charging means and extending through said compartment whereby said power cord may be stored within said compartment when not in use; an upwardly extending slot formed in one of the side walls of said battery charger, a projection integrally formed on said cover for cooperating with the slot formed in said side wall whereby the cover may be opened and closed by simply swinging the cover by means of said projection which is arranged to extend through said slot.

5. A storage case and battery charger for a motorized toothbrush comprising a housing formed of molded plastic insulating material, said housing having an integrally formed top wall, two side walls, a front wall, and a rear wall; an integrally formed plastic socket for receiving a toothbrush power handle extending downwardly from said top wall toward said bottom wall, said toothbrush power handle being formed of molded plastic insulating material, said socket having a side wall and a bottom wall; a charging contact fixed to the bottom of said socket, said wall; a charging contact fixed to said plastic side wall; a charging contact fixed to the bottom wall of said socket, said power handle having a generally circular side wall and an end bottom wall; a metal contact located on the end bottom wall of said power handle; a circular metal contact ring positioned upwardly from the contact formed on the end bottom wall of said plastic handle so that said power handle may be readily inserted into said socket for permitting the bottom contact on said handle to engage the contact fixed to the bottom wall of said socket, and the circular metal contact ring to engage the contact fixed to the circular side wall of said plastic socket; and an enlarged opening provided at the bottom of said charger housing, battery charging means positionable within said housing through said enlarged opening; an electric cord storage compartment formed within said housing at one side of said housing immediately adjacent to one of said side walls, a generally flat bottom plate and cover positioned immediately below said socket and battery charging means for closing said enlarged opening; hinge means connecting said cover to said bottom plate; an electrical power cord fixed to said battery charging means and extending through said compartment whereby said power cord may be stored within said compartment when not in use; a plurality of integrally formed toothbrush receiving meants extending downwardly from said top wall and into said cord receiving compartment; and a dovetailed slot integrally formed in the rear wall of said housing for mounting said housing on a wall or similar surface.

6. A storage case and battery charger for a motorized toothbrush comprising a housing formed of molded plastic insulated material, said housing having an integrally formed top wall, two side walls, a front wall, and a rear wall; an integrally formed plastic socket for receiving a toothbrush power handle extending downwardly from said top wall toward said bottom wall, said toothbrush power handle being formed of molded plastic insulating material, said socket having a generally circular side wall and a generally flat bottom wall spaced upwardly from the bottom wall of said housing; contact means generally centrally located in said flat bottom wall and vent means formed in the bottom wall of said socket, said contact means being spaced upwardly from said bottom wall and said vent means, an enlarged opening provided at the bottom of said charger housing, battery charging means positionable within said housing through said enlarged opening, an electrical cord storage compartment formed within said housing adjacent to one of said side walls, a generally flat bottom plate and cover positioned immediately below said socket and battery charging means for closing said enlarged opening, hinge means connecting said cover to said bottom plate, an electrical power cord fixed to said battery charging means and extending through said compartment whereby said power cord may be stored within said compartment when not in use, a plurality of integrally formed toothbrush receiving sockets extending downwardly from said top wall and into said cord receiving compartment.

References Cited in the file of this patent
UNITED STATES PATENTS

| | | |
|---|---|---|
| 2,415,447 | Stanton | Feb. 11, 1947 |
| 3,005,090 | Moore | Oct. 17, 1961 |

UNITED STATES PATENT OFFICE
CERTIFICATE OF CORRECTION

Patent No. 3,143,697                                August 4, 1964

Hans Springer

It is hereby certified that error appears in the above numbered patent requiring correction and that the said Letters Patent should read as corrected below.

Column 2, line 6, after "fully" insert -- inserted --; column 4, line 71, for "operated" read -- opened --; column 7, lines 15 and 16, strike out "a charging contact fixed to the bottom of said socket, said wa 1;".

Signed and sealed this 12th day of January 1965.

(SEAL)
Attest:

ERNEST W. SWIDER                                        EDWARD J. BRENNER
Attesting Officer                                             Commissioner of Patents